United States Patent
McNutt

(10) Patent No.: US 10,031,303 B1
(45) Date of Patent: Jul. 24, 2018

(54) METHODS FOR FORMING TIGHT BUFFERED OPTICAL FIBERS USING COMPRESSION TO FACILITATE SUBSEQUENT LOOSENING

(71) Applicant: Superior Essex International LP, Atlanta, GA (US)

(72) Inventor: Christopher W. McNutt, Woodstock, GA (US)

(73) Assignee: Superior Essex International LP, Atlanta, GA (US)

( * ) Notice: Subject to any disclaimer, the term of this patent is extended or adjusted under 35 U.S.C. 154(b) by 0 days.

(21) Appl. No.: 15/689,034

(22) Filed: Aug. 29, 2017

(51) Int. Cl.
 *G02B 6/44* (2006.01)
 *G02B 6/02* (2006.01)
 *C03C 25/1065* (2018.01)

(52) U.S. Cl.
 CPC ........ *G02B 6/4433* (2013.01); *C03C 25/1065* (2013.01); *G02B 6/02395* (2013.01); *G02B 6/4402* (2013.01); *G02B 6/4429* (2013.01)

(58) Field of Classification Search
 CPC ....... C03C 25/10; C03C 25/1065; G02B 6/02; G02B 6/02395; G02B 6/44; G02B 6/4402; G02B 6/4429; G02B 6/4433
 See application file for complete search history.

(56) References Cited

U.S. PATENT DOCUMENTS

| | | |
|---|---|---|
| 4,037,922 A | 7/1977 | Claypoole |
| 4,072,400 A | 2/1978 | Claypoole et al. |
| 4,100,008 A | 7/1978 | Claypoole |
| 4,472,021 A | 9/1984 | Ansel et al. |
| 4,585,534 A | 4/1986 | Pasternack et al. |
| 4,623,700 A | 11/1986 | Traver et al. |
| 4,679,899 A | 7/1987 | Kobayashi et al. |
| 4,689,248 A | 8/1987 | Traver et al. |
| 4,749,055 A | 6/1988 | Momiyama |
| 4,848,869 A | 7/1989 | Urruti |
| 4,877,306 A | 10/1989 | Kar |
| 4,889,768 A | 12/1989 | Yokoshima et al. |
| 4,893,893 A | 1/1990 | Claxton et al. |
| 4,923,754 A | 5/1990 | Lee et al. |
| 4,935,455 A | 6/1990 | Huy et al. |
| 4,953,945 A | 9/1990 | Nishimura et al. |
| 5,011,260 A | 4/1991 | Marx et al. |
| 5,054,883 A | 10/1991 | Eckberg |
| 5,139,816 A | 8/1992 | Eckberg |
| 5,181,268 A | 1/1993 | Chien |
| 5,268,984 A | 12/1993 | Hosoya et al. |
| 5,408,564 A | 4/1995 | Mills |
| 5,621,838 A | 4/1997 | Nomura et al. |
| 5,684,910 A | 11/1997 | Chapin et al. |
| 5,838,862 A | 11/1998 | Chien |
| 5,908,873 A | 6/1999 | Shustack |
| 5,949,940 A | 9/1999 | Botelho et al. |
| 6,298,189 B1 | 10/2001 | Szum et al. |

(Continued)

*Primary Examiner* — Andrew Jordan

(57) ABSTRACT

Methods for forming tight buffered cables containing a strippable buffer layer are described. An optical fiber may be provided, and a buffer layer formed from a polymeric material may be extruded around the optical fiber. The buffer layer may be compressed while the polymeric material is cooling following extrusion. The compression may facilitate subsequent loosening of the buffer layer from the optical fiber based at least in part upon stress relaxation of the buffer layer.

20 Claims, 4 Drawing Sheets

(56) References Cited

U.S. PATENT DOCUMENTS

| | | |
|---|---|---|
| 6,326,416 B1 | 12/2001 | Chien et al. |
| 6,339,666 B2 | 1/2002 | Szum et al. |
| 6,455,607 B1 | 9/2002 | Shustack |
| 6,538,045 B1 | 3/2003 | Murphy et al. |
| 6,559,197 B2 | 5/2003 | Fewkes et al. |
| 6,584,263 B2 | 6/2003 | Fewkes et al. |
| 6,661,959 B2 | 12/2003 | Szum et al. |
| 6,714,712 B2 | 3/2004 | Bishop et al. |
| 6,714,713 B2 | 3/2004 | Lanier et al. |
| 6,768,853 B2 | 7/2004 | Neveux, Jr. |
| 6,775,443 B2 | 8/2004 | Bringuier et al. |
| 6,797,740 B2 | 9/2004 | Abel et al. |
| 6,850,681 B2 | 2/2005 | Lepont et al. |
| 6,876,807 B2 | 4/2005 | Lanier et al. |
| 6,957,000 B2 | 10/2005 | McAlpine et al. |
| 6,993,226 B2 | 1/2006 | Castellani et al. |
| 7,041,712 B2 | 5/2006 | Murphy et al. |
| 7,088,897 B2 | 8/2006 | Kim et al. |
| 7,142,752 B2 | 11/2006 | Chiasson et al. |
| 7,155,100 B2 | 12/2006 | Murphy et al. |
| 7,214,431 B2 | 5/2007 | Komiya et al. |
| 7,221,841 B2 | 5/2007 | Chase et al. |
| 7,295,737 B2 | 11/2007 | Moorjani et al. |
| 7,346,244 B2 | 3/2008 | Gowan |
| 7,493,000 B2 | 2/2009 | Yamaguchi et al. |
| 7,660,505 B2 | 2/2010 | Chase et al. |
| 7,676,130 B2 | 3/2010 | Chien et al. |
| 7,742,668 B2 | 6/2010 | Nothofer et al. |
| 8,358,894 B2 | 1/2013 | Martin-Regalado et al. |
| 8,374,473 B2 | 2/2013 | Weimann et al. |
| 8,442,371 B2 | 5/2013 | Oyama et al. |
| 8,494,326 B2 | 7/2013 | Consonni et al. |
| 8,571,369 B2 | 10/2013 | Tatat |
| 8,655,127 B2 * | 2/2014 | Leonard ................ G02B 6/441 385/102 |
| 8,750,665 B2 | 6/2014 | Testu et al. |
| 9,442,264 B1 * | 9/2016 | Cheatle ................ G02B 6/443 |
| 2002/0037146 A1 | 3/2002 | Szum |
| 2002/0197040 A1 | 12/2002 | Takahashi et al. |
| 2005/0135763 A1 | 6/2005 | Drenzek et al. |
| 2005/0244113 A1 | 11/2005 | Chiasson et al. |
| 2007/0246687 A1 | 10/2007 | Yamaguchi et al. |
| 2008/0045623 A1 | 2/2008 | Yamaguchi et al. |
| 2008/0125546 A1 | 5/2008 | Yamaguchi et al. |
| 2008/0194736 A1 | 8/2008 | Lu |
| 2008/0226913 A1 | 9/2008 | Cattron |
| 2009/0171011 A1 | 7/2009 | Szum et al. |
| 2009/0279833 A1 * | 11/2009 | Overton ................ G02B 6/4494 385/111 |
| 2011/0026889 A1 | 2/2011 | Risch et al. |
| 2012/0031642 A1 | 2/2012 | Chambers |
| 2013/0108230 A1 | 5/2013 | Nave |
| 2015/0299605 A1 | 10/2015 | Tomsheck |
| 2016/0060476 A1 | 3/2016 | Chen |

\* cited by examiner

METHODS FOR FORMING TIGHT BUFFERED OPTICAL FIBERS USING COMPRESSION TO FACILITATE SUBSEQUENT LOOSENING

TECHNICAL FIELD

Embodiments of the disclosure relate generally to tight buffered optical fibers and, more particularly, to methods for forming tight buffered optical fibers having a strippable buffer layer.

BACKGROUND

Optical fiber cables are utilized in a wide variety of applications, and many cables include tight buffered optical fibers. A tight buffered optical fiber typically includes an optical waveguide fiber, one or more protective coatings (e.g., a primary coating, a secondary coating, etc.) surrounding an outer surface of the fiber, and a buffer layer formed to surround the optical fiber and its protective coating(s). The buffer layer is formed in intimate contact with the optical fiber or outer protective coating(s), requiring the buffer layer to be stripped in order to access the optical fiber. For example, during installation or patching of a cable, a technician is often required to strip a buffer layer from an optical fiber in order to terminate the optical fiber.

Conventional tight buffers are often difficult to strip or remove from an underlying optical fiber at lengths longer than an inch or two without damaging the protective coating(s) or breaking the fibers. As a result, the stripping of conventional buffer layers often requires multiple passes of stripping small segments of a tight buffer layer until a desired strip length is reached. This process is time consuming and inconvenient. Accordingly, there is an opportunity for improved tight buffer designs that are relatively easy to strip from optical fibers. Additionally, there is an opportunity for improved methods or processes for forming tight buffers on optical fibers such that the buffer layers may be relatively easier to strip or remove.

BRIEF DESCRIPTION OF THE DRAWINGS

The detailed description is set forth with reference to the accompanying figures. in the figure, the left-most digit(s) of a reference number identifies the figure in which the reference number first appears. The use of the same reference numbers in different figures indicates similar or identical items; however, various embodiments may utilize elements and/or components other than those illustrated in the figures. Additionally, the drawings are provided to illustrate example embodiments described herein and are not intended to limit the scope of the disclosure.

DETAILED DESCRIPTION

Figure 1:
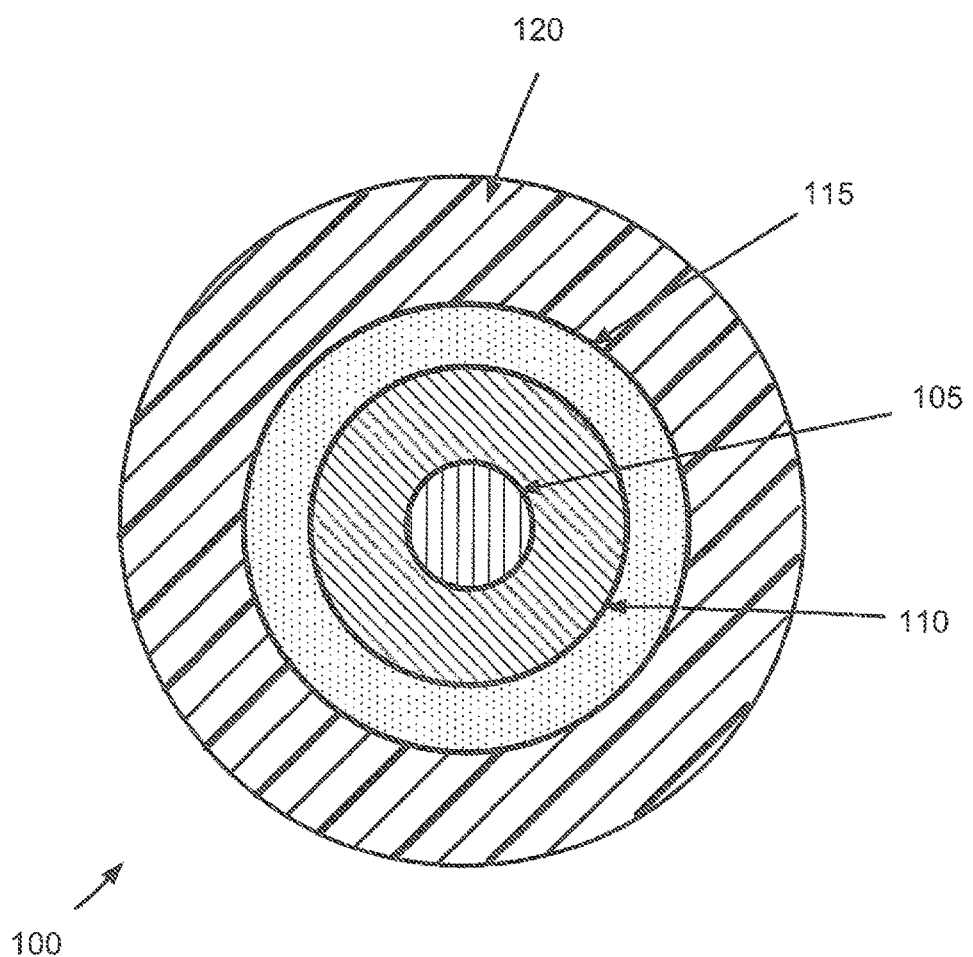
FIG. 1 is a cross-sectional view of a tight buffered optical fiber, according to an illustrative embodiment of the disclosure.

Various embodiments of the present disclosure are directed to tight buffered optical fibers, cables incorporating tight buffered optical fibers, and methods for forming tight buffered optical fibers. An optical fiber, such as an optical fiber including a core, a cladding, and one or more protective coatings, may be surrounded by a tight buffer layer along a longitudinal direction of the fiber. Additionally, according to an aspect of the disclosure, the tight buffer layer may be formed and/or processed in a way that facilitates easier stripping from the optical fiber relative to conventional tight buffets. For example, in certain embodiments, the tight buffer layer may be stripped from the optical fiber with a force of approximately 13.3 Newtons or less per 15 millimeters of tight buffer removed.

In certain embodiments, a tight buffer layer may be formed on and/or around an optical fiber. As desired, the tight buffer layer may be formed from any number of suitable materials. For example, a tight buffer layer may be formed from a suitable thermoplastic polymer, polymeric material, and/or combination of materials. According to an aspect of the disclosure, the tight buffer layer may be formed via a suitable extrusion process. Additionally, prior to complete cooling of the tight buffer layer following extrusion, the tight buffer layer may be compressed via any number of suitable compression devices, such as rollers, dies, belts, pulleys, air jets, etc. As a result of the compression, once the tight buffer layer cools, stress relaxation of the tight buffer material may facilitate release, loosening, or breaking away of the tight buffer layer from the underlying optical fiber. Accordingly, the tight buffer layer may be easier to strip or remove from the optical fiber.

As desired in various embodiments, the tight buffer layer may be compressed by any suitable amount during cooling. In certain embodiments, the tight buffer layer may be compressed by an amount that is approximately equal to or greater than an amount of post-extrusion shrinkage that the tight buffer layer may exhibit in approximately the same extrusion process and/or conditions without compression. In various embodiments, an amount of compression may be based at least in part on the material(s) utilized to form the buffer layer and/or various processing and/or environmental parameters and/or conditions. Additionally, the tight buffer layer may be compressed at any suitable temperature during cooling. In certain embodiments, the tight buffer layer may be compressed at a temperature that permits compression of the buffer layer without deforming a cross-sectional structure of the buffer layer. A wide variety of suitable and/or optimal compression temperatures may be utilized as desired for various materials. For example, the tight buffer layer may be compressed at a temperature that is between a glass transition temperature and a melt point of the material(s) utilized to form the buffer layer.

In certain embodiments, the tight buffer layer may be cooled following extrusion and prior to compression in order to attain a desired compression temperature. Additionally, as desired, the tight buffer layer may be cooled following compression. In certain embodiments, once the tight buffer layer has cooled, the buffer layer may be optionally reheated in order to facilitate and/or enhance stress relaxation of the buffer layer. Additionally or alternatively, the tightly buffered optical fiber may optionally be bent, flexed, or strained in order to facilitate the breaking of a bond between the buffer layer and the underlying fiber. Further, in certain embodiments, one or more suitable materials, such as water blocking powder and/or water blocking gel, may be applied to an outer surface of the optical fiber prior to extrusion of the buffer layer, thereby facilitating relatively quicker stress relaxation.

Embodiments of the disclosure now will be described more fully hereinafter with reference to the accompanying drawings, in which certain embodiments of the disclosure are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

With reference to FIG. 1, a cross-sectional view of an example tight buffered optical fiber 100 is illustrated. The tight buffered optical fiber 100 may include at least one optical fiber with a core 105 and a cladding 110. In certain embodiments, one or more protective coatings 115 or protective layers may be formed on the cladding 110. A tight buffer layer 120 may then be formed on the protective coating(s) 115 or, in embodiments with no protective coating(s), directly on the cladding. As desired, the combination of the core 105 and the cladding 110 may be referred to as an optical fiber or an optical wave guide. In other embodiments, the combination of the core 105, cladding 110, and the protective coatings may be referred to as an optical fiber or an optical wave guide. Additionally or alternatively, the tight buffered optical fiber, including the optical wave guide, one or more optional protective coatings, and a buffer layer, may be generally referred to as an optical fiber.

As illustrated in FIG. 1, in certain embodiments, the optical fiber may include a single core 105. In other embodiments, the optical fiber may include multiple cores. The core 105 may be configured to propagate light at one or more desirable wavelengths (e.g., 1310 nm, 1550 nm, etc.) and/or at any desired transmission rate or data rate, such as a transmission rate between, approximately 10 Giga bits per second ("Gbps") and approximately 40 Gbps. The cladding 110 may have a lower index of refraction than that of the core 105, to facilitate propagation of a signal through the core 105. The core 105 and the cladding 110 may include any suitable compositions and may be formed from a wide variety of suitable materials, such as glass, glassy substance(s), one or more silica materials, one or more plastic materials, or a suitable combination, of materials.

A wide variety of different types of optical fibers may be utilized as desired in various embodiments. For example, an optical fiber may be a single mode fiber, multi-mode fiber, bend insensitive fiber, or some other suitable optical waveguide that carries data. The optical fiber may also have any suitable cross-sectional diameter or thickness. For example, a single mode fiber may have a core diameter between approximately 8 micrometers and approximately 10.5 micrometers with a cladding diameter of approximately 125 micrometers. As another example, a multi-mode fiber may have a core diameter of approximately 50 micrometers or 62.5 micrometers with a cladding diameter of 125 micrometers. Other sizes of fibers may be utilized as desired.

In certain embodiments, one or more protective coatings 115 may be formed on or around the cladding 110. The protective coating(s) 115 may protect the optical fiber from physical, mechanical, and/or environmental damage. For example, the protective coating(s) 115 may protect against mechanical stresses, scratches, and/or moisture damage. In the event that multiple protective coatings are utilized, the coatings may be applied in concentric layers. In certain embodiments, a dual-layer protective coating approach may be utilized. An inner primary coating may be formed around the cladding 110, and an outer secondary coating may be formed around the inner coating. The outer secondary coating may be harder than the inner primary coating. In this regard, the inner primary coating may function as a shock absorber to minimize attenuation caused by microbending, and the outer secondary coating may protect against mechanical damage and act as a barrier to lateral forces.

Other configurations of protective coating(s) 115 may be utilized as desired in various embodiments. Additionally, the protective coating(s) 115 may be formed from a wide variety of suitable materials and/or combinations of materials. A few example materials include, but are not limited to acrylates, acrylate resins, ultraviolet ("UV")-cured materials, urethane acrylate composite materials, etc.

A buffer layer 120 may be formed around the optical fiber and, if present, the protective coating(s). According to an aspect of the disclosure, the buffer layer 120 may be formed in intimate contact with an underlying layer along a longitudinal length of the optical fiber. In other words, the buffer layer 120 may encapsulate the underlying optical fiber and protective coating(s) at any given cross-section of the optical fiber taken along a longitudinal direction. The formation of a buffer layer 120 in intimate contact with an underlying layer (i.e., approximately no spacing between the buffer layer 120 and an underlying layer at the time of formation, etc.) may be referred to as a tight buffered configuration. Thus, the combination of the optical fiber and the buffer layer 120 may be referred to as a tight buffered optical fiber.

Additionally, in certain embodiments, the buffer layer 120 may be formed directly on an outer protective coating or, if no protective coatings are utilized, directly on the optical fiber. In other words, no intermediate layers may be positioned between the buffer layer 120 and an outer protective coating (or cladding if no protective coatings are utilized). Certain conventional tight buffer designs incorporate a release layer between an optical fiber (or coated optical fiber) and a tight buffer layer. As a result of forming the buffer layer 120 directly on the optical fiber or outer protective coating, no release layer will be present. In other embodiments, as explained in greater detail below, one or more substances or materials (e.g., water blocking powder, water blocking gel, etc.) may be applied to an outer surface of the optical fiber prior to formation of the buffer layer 120. In yet other embodiments, a suitable release layer or other layer may optionally be formed between the optical fiber and the buffer layer 120.

A wide variety of suitable materials and/or combinations of materials may be utilized to form the buffer layer 120. For example, the buffer layer 120 may be formed from one or more suitable polymeric materials and/or thermoplastic materials. Examples of suitable materials include, but are not limited to polypropylene ("PP"), polyvinyl chloride ("PVC"), a low smoke zero halogen ("LSZH") material, polyethylene ("PE"), nylon, polybutylene terephthalate ("PBT"), polyvinylidene fluoride ("PVDF"), fluorinated ethylene propylene ("FEP"), etc. In certain embodiments, a polymeric material may include a single material component or a mixture of various components. Additionally, in certain embodiments, the buffer layer 120 may be formed as a single layer. In other embodiments, the buffer layer 120 may include a plurality of layers, such as a plurality of coextruded or successively extruded layers. In the event that a plurality of layers are utilized, in certain embodiments, each layer may be formed from the same or from similar materials. In other embodiments, at least two layers may be formed from different materials.

In certain embodiments, one or more polymeric and/or thermoplastic material(s) may form a base material of the buffer layer 120, and one or more additives may be combined, mixed, or blended with the base material. For example, one or more slip agents or release agents, such as a siloxane material, a material containing silicon, a material containing one or more functional groups having a Si—O—Si linkage or another suitable slip agent, may be optionally combined with the base material. The slip agents may facilitate relatively easier stripping of the buffer layer 120 from the underlying optical fiber. As desired, a slip agent may be combined with a base material with any suitable mix rates or blend rates. For example, a mixture or compound containing both a base material and a slip agent may include approximately 0.5%, 1.0%, 1.5%, 2.0%, 2.5%, 3.0%, 3.5%, 4.0%, 4.5%, or 5.0%, a percentage incorporated into a range between any two of the above values, or a percentage incorporated into a range bounded on either a minimum or maximum end by one of the above values, of slip agent by volume.

Regardless of the material components utilized to form a buffer layer 120, a wide variety of suitable methods and/or techniques may be utilized as desired to form the buffer layer 120 on the optical fiber. In certain embodiments, a tight buffer layer 120 may be extruded onto an optical fiber via one or more suitable extrusion devices, such as one or more suitable extrusion heads. In one example embodiment, either prior to or during the formation of a cable, an optical fiber may be fed from a suitable source (e.g., a bin, a reel, a box, etc.), and the optical fiber may be fed in relatively close proximity to one or more extrusion devices. The extrusion devices may extrude tight buffer material onto the optical fiber and, as desired, the optical fiber may be passed through one or more dies in order to control an outer diameter of the extruded tight buffer 120.

In certain embodiments, an inner diameter of the tight buffer layer 120 may be approximately equal to an outer diameter of the optical fiber or outermost protective coating. In other words, the tight buffer layer 120 may be formed in intimate contact with the underlying optical fiber. Additionally, the tight buffer layer 120 may be formed with any suitable outer diameter. For example, in certain embodiments, the tight buffer layer 120 may be extruded or otherwise formed to have an outer diameter of approximately 900 microns or micrometers. In other embodiments, the tight buffer layer 120 may be formed to have an outer diameter between approximately 500 microns and approximately 900 microns. In yet other embodiments, the tight buffer layer 120 may be formed to have an outer diameter between approximately 400 microns and approximately 900 microns. Other suitable outer diameters may be utilized as desired.

Because a wide variety of suitable outer diameters may be utilized for the tight buffer layer 120, the tight buffer layer 120 may be formed with a wide variety of suitable thicknesses as desired in various embodiments. In certain example embodiments, the tight buffer layer 120 may have a thickness between approximately 50 microns or micrometers and approximately 875 microns. For example, the tight buffer layer 120 may have a thickness of at least approximately 325 microns.

According to an aspect of the disclosure, following extrusion of the tight buffer layer 120 and prior to complete cooling of the tight buffer layer 120, the tight buffer layer 120 may be compressed. Any number of suitable devices and/or systems may be utilized to compress the buffer layer 120 as desired, such as any number of rollers, dies, belts and pulleys, air jets, etc. For example, prior to cooling of the buffer layer 120, one or more rollers or other devices may operate on the buffer layer 120 in order to compress the extruded buffer layer material towards the underlying optical fiber and/or in a lateral direction along the longitudinal length of the buffer layer 120. As another example, one or more compressed gas ejectors, such as hot air jets, may operate on the buffer layer 120 in order to compress the extruded buffer layer material towards the underlying optical fiber and/or in a lateral direction along the longitudinal length of the buffer layer 120. The use of hot air jets may facilitate maintaining a desired temperature of the buffer layer material during the compression. Once the tight buffer layer 120 cools, the polymeric material(s) utilized to form the buffer layer 120 may be subject to stress relaxation in order to relieve at least a portion of the stress induced by the compression. In other words, the buffer layer 120 may expand in a direction opposite the compression. Additionally, the stress relaxation and/or expansion may facilitate the buffer layer 120 at least partially breaking away from or separating from the underlying optical fiber. As a result, the buffer layer 120 may be easier to strip or remove from the optical fiber.

As desired in various embodiments, the buffer layer 120 may be compressed by any suitable amount during cooling. In certain embodiments, the buffer layer 120 may be compressed by an amount that is approximately equal to or greater than an amount of post-extrusion shrinkage that the tight buffer layer 120 might exhibit in approximately the same extrusion process and/or conditions without compression. In other words, if the buffer layer 120 were not compressed, then the buffer layer 120 would typically shrink after cooling due to stress relaxation. This shrinkage may impart stresses on the optical fiber and result in excess fiber length. By compressing the buffer layer 120, post extrusion shrinkage may be limited or reduced. Additionally, compressing the buffer layer 120 may assist in breaking an adhesion or bond between the extruded buffer layer material and an underlying optical fiber. It will be appreciated that an anticipated or expected amount of post-extrusion shrinkage may be based at least in part upon the material(s) utilized to form the buffer layer 120 and/or the processing and/or environmental conditions associated with the extrusion. These parameters and/or factors may be taken into account as desired in order to determine an amount of compression imparted on the buffer layer 120.

In certain embodiments, a buffer layer 120 may be compressed by approximately 0.25%, 0.5%, 0.75%, 1.0%, 2.0%, 2.5%, 2.75%, 3.0%, 3.25%, 3.5%, 3.75%, 4.0%, 4.25%, 4.5%, 4.75%, 5.0%, 5.5%, 6.0%, 7.0%, 8.0%, 9.0%, or 10.0% of its original volume, by a percentage included in a range between two of the above values (e.g., between approximately 3.5% and approximately 4.5% of its original volume, etc.), or by a percentage included in a range bounded on either a minimum or maximum end by one of the above values (e.g., by at least approximately 3.5% of its original volume, etc.). The buffer layer 120 may also be compressed in any suitable direction and/or combination of directions. In various embodiments, the buffer layer 120 may be compressed in a downward direction and/or in a lateral direction. Compressing the buffer layer 120 in a downward direction towards the underlying optical fiber may assist in breaking the adhesion or bond between the buffer layer 120 and the optical fiber. Compressing the buffer layer 120 in a lateral direction along a longitudinal length of the optical fiber (e.g., in a direction opposite to the path of the buffer layer within a manufacturing system, etc.) may assist in countering post extrusion shrinkage. In certain embodiments, the buffer layer 120 may be compressed in a direction that is at an acute angle to the longitudinal length of the optical fiber. The angular direction may provide both downward and lateral compression. As desired, the angle may be selected in order to provide a desired amount of compression and/or to facilitate a desired strip force to remove the buffer layer 120 following extrusion and cooling. Additionally, in certain embodiments, a plurality of separate or distinct compression operations may , be performed on the buffer layer 120. For example, separate downward and lateral compressions may be performed. As another example. a plurality of angular compressions may be performed.

Additionally, the tight buffer layer 120 may be compressed at any suitable temperature during cooling. In certain embodiments, the tight buffer layer 120 may be compressed at a temperature or within a temperature range that permits compression of the buffer layer 120 without deformation of a cross-sectional structure of the buffer layer 120. In other words, even when compressed, the buffer layer 120 may maintain its extruded structure and/or cross-sectional geometric shape. For example, the tight buffer layer 120 may be compressed at a temperature (or within a temperature range) at which the buffer layer 120 is in a relatively semi-solid state. In various embodiments, a temperature and/or temperature range at which the buffer layer 120 may be compressed may be based at least in part upon a wide variety of different factors, such as the material(s) utilized to form the buffer layer 120 and/or the processing and/or environmental conditions.

A wide variety of suitable and/or optimal compression temperatures may be utilized as desired for various materials. In certain embodiments, the tight buffer layer 120 may be compressed at a temperature that is between a glass transition temperature and a melt point of the material(s) utilized to form the buffer layer. For example, the buffer layer 120 may be compressed at a temperature that is approximately at a midpoint between the glass transition temperature and the melt point of the material(s) utilized to form the buffer layer.

In certain embodiments, the tight buffer layer 120 may be cooled following extrusion and prior to compression in order to attain a desired compression temperature. Additionally, as desired, the tight buffer layer 120 may be cooled following compression. A wide variety of suitable devices, systems, methods and/or techniques may be utilized to cool the buffer layer 120. For example, the buffer layer 120 may be cooled via air cooling, water or fluid cooling, mist cooling, oil cooling, and/or via any number of other suitable methods.

Following cooling of the tight buffer layer 120, stress relaxation may result in or contribute to expansion of the buffer layer 120 and/or the weakening or breaking of a bond between the buffer layer 120 and the underlying optical fiber. In certain embodiments, once the buffer layer 120 has cooled after compression, the buffer layer 120 may be optionally reheated in order to facilitate and/or enhance stress relaxation of the buffer layer 120. A wide variety of suitable systems, devices, methods, and/or techniques may be utilized to reheat the buffer layer 120, for example, ovens, heating coils, other beating devices, etc. The buffer layer 120 may be reheated to any suitable temperature, such as a temperature that may induce stress relaxation.

Additionally or alternatively, in certain embodiments, the tightly buffered optical fiber 100 may optionally be bent, flexed, or strained in order to facilitate the breaking of a bond between the buffer layer 120 and the underlying fiber. For example , the tightly buffered fiber 100 may be reheating and then stressed in order to induce stress relaxation and/or facilitate least partial separation of the buffer layer 120 from the fiber. A wide variety of suitable devices and/or systems, such as a wire straightener, may be utilized to bend or flex the tightly buffered optical fiber 100 as desired in various embodiments. Additionally, the tightly buffered fiber 100 may be bent or flexed by any suitable amount, for example, by approximately 40 mm, 50 mm, 60 mm, 70 mm, 80 mm, an amount included in a range between any two of the above values, or an amount included in a range bounded on either a minimum or maximum end by one of the above values. Further, the tightly buffered fiber 100 may be flexed at a wide variety of locations along its longitudinal length. For example, the tightly buffered fiber 100 may be flexed approximately every 0.25, 0.5, 0.75, 1.0, 1.5, 2.0, 2.5, 3.0, 4.0, or 5.0 m, at a distance included in a range between any two of the above values, or at a distance included in a range bounded on either a minimum or maximum end by one of the above values. In certain embodiments, the tightly buffered fiber 100 may be flexed, at various locations in accordance with a desired pattern. In other embodiments, the tightly buffered fiber 100 may be flexed in a random or pseudorandom manner.

Further, in certain embodiments, one or more suitable materials may be applied to an outer surface of the optical fiber prior to extrusion of the buffer layer 120, thereby facilitating a relatively quicker onset of stress relaxation and/or the weakening of a bond between the extruded buffer layer 120 and the fiber. In certain embodiments, a water blocking, substance, such as water blocking powder and/or water blocking gel, may be applied to the fiber prior to extrusion of the buffer layer 120. Examples of suitable water blocking substances include, but are not limited to, polybutylene oils, other polyolefin based oils, and/or a wide variety of suitable saturated polymers. Additionally or alternatively, in certain embodiments, one or more slip agents and/or release agents, such as any of the slip agents described above, may be applied to the fiber prior to extrusion of the buffer layer 120.

As a result of compressing a buffer layer 120 following extrusion, it may be relatively easier to strip the buffer layer 120 from an optical fiber. In certain embodiments, the tight buffer layer 120 may be stripped from the optical fiber with a force of approximately 13.3 Newtons ("N") per 15 cm of intact tight buffer. In other embodiments, approximately 15 cm of buffer layer 120 may be stripped from the optical fiber with a force of approximately 10.0. 12.0, 13.3, 15.0, 17.5, 20.0 N or less, or by a maximum force incorporated into a range between any two of the above values. In yet other embodiments, relatively greater length of buffer layer may be stripped from the optical fiber with a force of approximately 13.3 N or less (or with any other suitable strip force specified above), such as approximately 20 cm, 30 cm, 40 cm, 50 cm, any other suitable length.

The buffer layer 120 described with reference to FIG. 1 may be utilized in conjunction with a wide variety of different optical fibers. These optical fibers may include more or less than the components described for the optical fiber 100 of FIG. 1. The optical fiber 100 of FIG. 1 is provided by way of example only. Additionally, similar techniques and/or buffer layers may be utilized in association with optical fiber ribbons and/or optical fiber ribbon cables. For example, the buffer material formed around an optical fiber ribbon may be compressed in a similar manner in order to facilitate relatively easier stripping.

Figure 2:
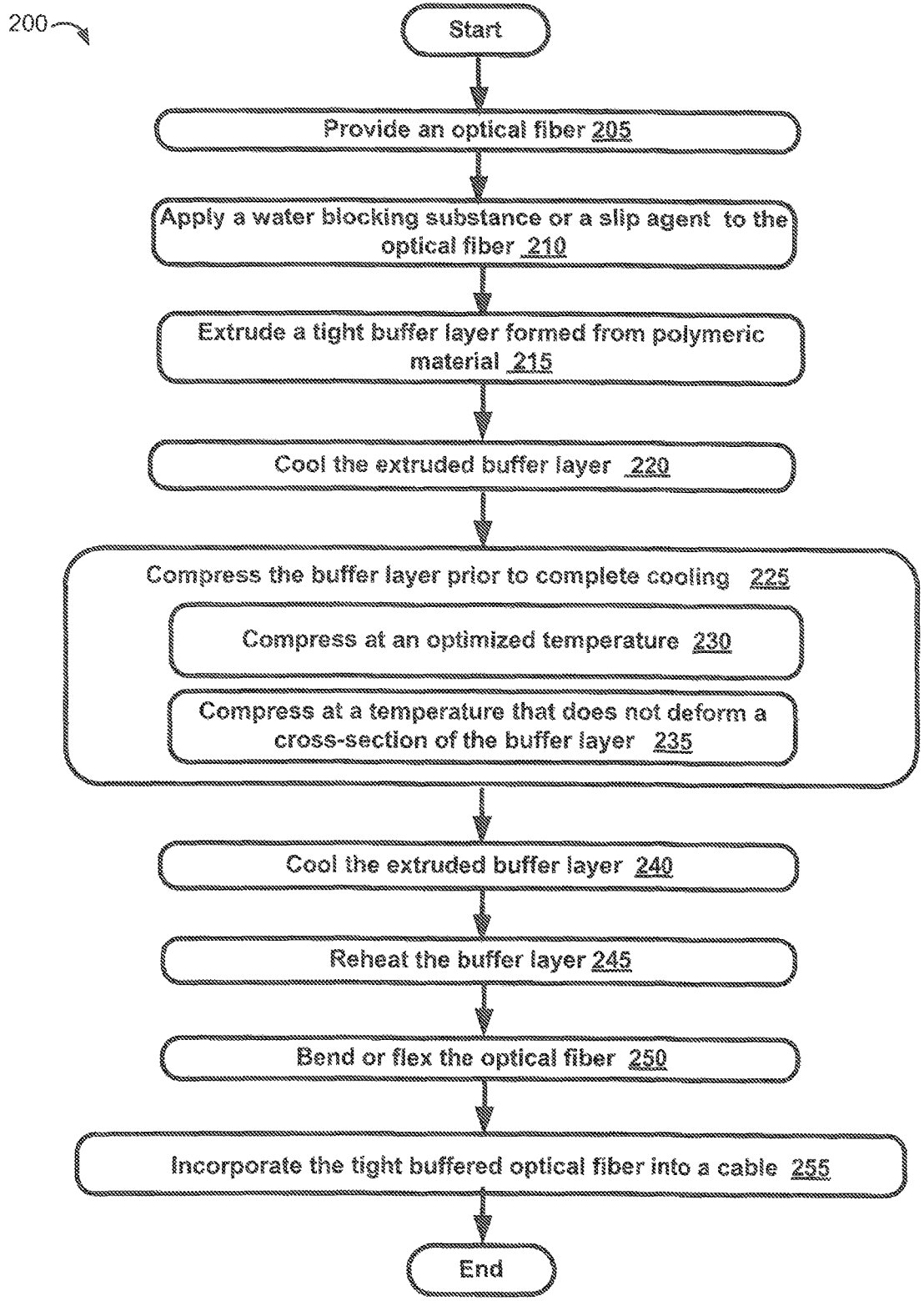
FIG. 2 is a flow chart illustrating an example method for forming a tight buffered optical fiber, according to an illustrative embodiment of the disclosure.

A wide variety of suitable methods and/or techniques may be utilized to form a tight buffered optical fiber with a strippable buffer layer. FIG. 2 is a flow chart illustrating one example method 200 for forming a tight buffered optical fiber, such as the tight buffered optical fiber 100 illustrated in FIG. 1. The method 200 may begin at block 205. At block 205, an optical fiber may be provided. As set forth above, a wide variety of different types of optical fibers, such as single mode or multi-mode optical fibers, may be provided. Additionally, an optical fiber may include a core, a cladding, and any number of suitable protective coatings formed on the cladding. In certain embodiments, an optical fiber may be provided from a suitable source, such as a spool, reel, or bin. Additionally, although a single optical fiber is described with reference to the method 200 of FIG. 2, in other embodiments, a plurality of optical fibers or an optical fiber ribbon may be provided.

At block 210, which may be optional in certain embodiments, one or more suitable substances may be applied to an outer surface of the optical fiber. For example, a water blocking substance, such as a water blocking powder or a water blocking gel, may be applied to the outer surface. In certain embodiments, a water blocking substance may be applied on approximately an entire outer surface of the optical fiber. In other embodiments, a water blocking substance may be applied to a portion of the outer surface. As desired, the water blocking substance may be applied in accordance with a pattern or, alternatively, in a random or pseudo-random manner. Application of a water blocking substance may contribute to promotion of stress relaxation following compression of a buffer layer. As another example of applying a substance at block 210, a slip agent or release agent, such as a siloxane or silicon-containing release agent, may be applied to at least a portion of an outer surface of the optical fiber. A slip agent may facilitate easier separation of a subsequently formed buffer layer from the underlying optical fiber.

At block 215, a tight buffer layer may be extruded on and/or around the optical fiber. As set from above, the tight buffer layer may be extruded via any number of suitable devices, such as one or more extrusion heads. Additionally, the tight buffer layer may be formed from any suitable materials, such as thermoplastic and/or other polymeric materials. The buffer layer may be formed with any suitable thickness and/or in any number of suitable layers as desired in various embodiments.

At block 220, which may be optional in certain embodiments, the extruded buffer layer may be cooled following extrusion and prior to compression. For example, the extruded buffer layer may be cooled in order to facilitate attaining a desired temperature or a temperature within a desired temperature range at which the buffer layer may be compressed. A wide variety of suitable systems, devices, methods, and/or techniques may be utilized as desired to cool the extruded buffer layer. For example, the buffer layer may be cooled via air cooling, water cooling, oil cooling, mist cooling. etc.

At block 225, the buffer layer may be compressed prior to the buffer layer completely cooling. A wide variety of suitable systems, devices, methods, and/or techniques may be utilized to compress the buffer layer. For example, the buffer layer may be compressed via one or more rollers, dies, belts and pulleys, air jets, and/or other suitable compression systems. As set forth above, the buffer layer may be compressed by any suitable amount and/or any suitable direction or combination of directions (e.g., towards the optical fiber, laterally along a longitudinal length of the buffer layer, etc.). Additionally, the buffer layer may be compressed at any suitable temperature. According to an aspect of the disclosure, the buffer layer may be compressed at a temperature or within a temperature range that permits compression of the buffer layer without allowing deformation of a cross-sectional structure of the buffer layer. For example, at block 230, the buffer layer may be compressed at an optimized temperature (or within an optimal temperature range), such as a temperature at which the buffer layer is in a relatively semi-solid state. As another example, at block 235, the buffer layer may be compressed at a temperature that is between a glass transition temperature and a melt point of the material(s) utilized to form the buffer layer. Indeed, the buffer layer may be compressed at a wide variety of suitable temperatures.

At block 240, the buffer layer may be cooled following compression. In certain embodiments, the compressed buffer layer may be permitted to cool on its own via its interactions with the ambient environment. In other embodiments, a wide variety of suitable devices, systems, methods and/or techniques may be utilized to cool the buffer layer. For example, the buffer layer may be cooled via air cooling, water or fluid cooling, mist cooling, oil cooling, and/or via any number of other suitable methods. Following cooling of the buffer layer, stress relaxation may result in or contribute to expansion of the buffer layer and/or the weakening or breaking of a bond between the buffer layer and the underlying optical fiber.

In certain embodiments, once the buffer layer has cooled after compression, the buffer layer may be optionally reheated at block 245 in order to facilitate and/or enhance stress relaxation of the buffer layer. A wide variety of suitable systems, devices, methods, and/or techniques may be utilized to reheat the buffer layer, for example, ovens, heating coils, other heating devices, etc. The buffer layer may be reheated to any suitable temperature, such as a temperature that may induce stress relaxation. At block 250, the tightly buffered optical fiber may optionally be bent, flexed, or strained in order to facilitate the breaking of a bond between the buffer layer and the underlying fiber. For example, the tightly buffered fiber may be reheating and then stressed in order to induce stress relaxation and/or facilitate at least partial separation of the buffer layer from the fiber. A wide variety of suitable devices and/or systems, such as a wire straightener, may be utilized to bend or flex the tightly buffered optical fiber as desired in various embodiments.

At block 255, the tightly buffered optical fiber may be incorporated into a cable or suitable cable component. For example, the buffered optical fiber may be positioned within the core of a cable or jacketed within a core of a cable. As desired, the optical fiber may be incorporated into a wide variety of different types of cables. A few example cables are discussed in greater detail below with reference to FIGS. 3 and 4. Additionally, in certain embodiments, the optical fiber may be provided downstream to other systems or components for inline incorporation into a cable or cable component. In other embodiments, the optical fiber may be taken up or collected for subsequent incorporation into a cable or cable component. The method 200 may end following block 255.

The operations described and shown in the method 200 of FIG. .2 may be carried out or performed in any suitable order as desired in various embodiments. Additionally, in certain embodiments, at least a portion of the operations may be carried out in parallel. Furthermore, in certain embodiments, less than or more than the operations described in FIG. 2 may be performed.

A wide variety of different types of cables may be constructed utilizing one or more tight buffered optical fibers, such as the optical fibers discussed herein. These cables may include, for example, optical fiber cables, telecommunications cables, and/or a wide variety of composite cables (e.g., cables including a combination of optical fiber(s) and other transmission media). Additionally, embodiments of the disclosure may be utilized in association with drop cables, horizontal cables, vertical cables, flexible cables, plenum cables, riser cables, or any other appropriate cables.

Figure 3:
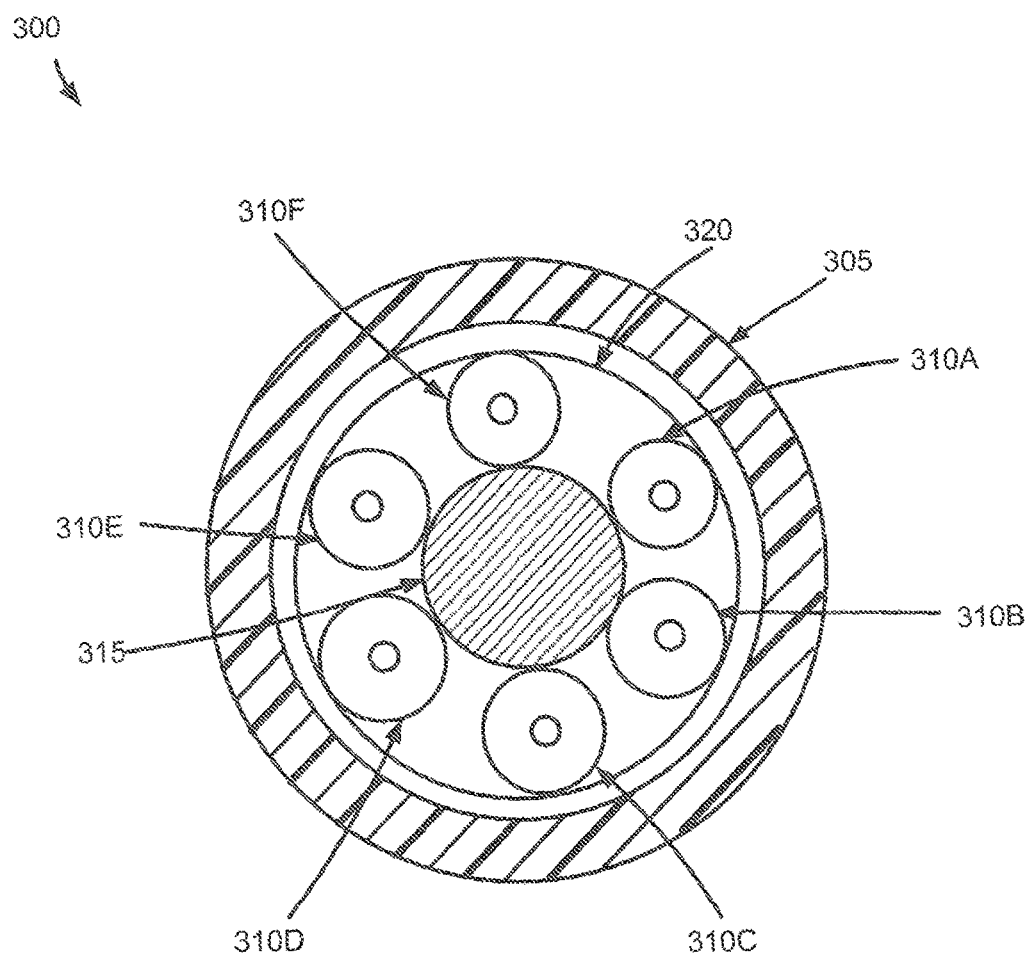
FIGS. 3-4 illustrate example cable constructions that may incorporate tight buffered optical fibers, according to illustrative embodiments of the disclosure.

FIG. 3 illustrates one example cable 300 that may incorporate tight buffered optical fibers, according to illustrative embodiments of the disclosure. The cable 300 may include an outer jacket 305, and at least one optical fiber 310A-F may be situated or positioned within the outer jacket 305. As shown in FIG. 3, each of the optical fibers 310A-F (generally referred to as optical fiber 310) may be a tight buffered optical fiber similar to the optical fiber 100 described above with reference to FIG. 1. In other embodiments, one or more optical fibers may be positioned within buffer tubes or other fiber sheaths and/or subunits.

The outer jacket 305 may enclose the internal components of the cable 300, seal the cable 300 from the environment, and provide strength and structural support. The jacket 305 may include any number of layers (e.g., a single layer, multiple layers, etc.) and may be formed from a wide variety of suitable materials, such as one or more polymeric materials, polyvinyl chloride ("PVC"), polyurethane, a fluoropolymer, polyethylene, neoprene, chlorosulphonated polyethylene, polypropylene, modified ethylene-chlorotrifluoroethylene, ethylene-vinyl acetate ("EVA"), fluorinated ethylene propylene ("FEP"), ultraviolet resistant PVC, flame retardant PVC, low temperature oil resistant PVC, polyolefin, flame retardant polyurethane, flexible PVC, low smoke zero halogen ("LSZH") material, plastic, rubber, acrylic, or some other appropriate material known in the art or a combination of suitable materials. In certain embodiments, the jacket 305 can include flame retardant and/or smoke suppressant materials. Additionally, the jacket 305 may include a wide variety of suitable shapes and/or dimensions. For example, as shown in FIG. 3, the jacket 305 may be formed to result in a round cable or a cable having an approximately circular cross-section. In other embodiments, the jacket 305 may be formed to result in other desired shapes, such as an elliptical shape (e.g., a cable having an approximately oval cross-section) or a rectangular shape. The jacket 305 may also have a wide variety of dimensions, such as any suitable or desirable outer diameter and/or any suitable or desirable wall thickness. In various embodiments, the jacket 305 can be characterized as an outer jacket, an outer sheath, a casing, a circumferential cover, or a shell.

The jacket 305 may enclose one or more openings in which other components of the cable 300 are disposed. At least one opening enclosed by the jacket 305 may be referred to as a cable core, and transmission media may be disposed in the cable core. In the cable 300 illustrated in FIG. 1, a plurality of tight buffered optical fibers 310A-F may be disposed in the cable core. In certain embodiments, the jacket 305 may be extruded or pultruded over the optical fibers 310A-F during construction of the cable 300. For example, the optical fibers 310A-F may be stranded or otherwise cabled together, and the jacket 305 may be formed over the stranded optical fibers 310A-F.

In certain embodiments, one or more strength members may be incorporated into the cable 300. For example, one or more strength members, such as central strength member 315, may be disposed or positioned within a cable core. As desired, the tight buffered optical fibers 310A-F (and/or other cable components situated within the cable core) may be stranded around the central strength member 315. For example, the optical fibers 310A-F may be helically twisted or S-Z stranded about the central strength member 315. In other embodiments, one or more strength members may be embedded in the cable jacket 305. For example, strength rods may be embedded in the cable jacket 305 on opposite sides of a cable core. In another example embodiment, the cable 300 can be formed with a "figure-8" design that is suitable for aerial deployment, for example, spanning between poles. In such a design, a strength member can be positioned within one loop of, the figure-8 and a cable core containing one or more transmission Media may be positioned within the other loop. Indeed, a wide variety of different cable constructions may incorporate one or more tight buffered optical fibers and one or more strength members at various positions.

Strength members, such as the central strength member 315, may be formed from a wide variety of suitable materials. For example, strength members may be formed from metal wires (e.g., steel wire, etc.), metal rods, plastic rods, fiber-reinforced plastic ("FRP") rods, glass-reinforced plastic ("GRP") rods, fiberglass, or any other suitable material or combination of materials. As desired, a strength member may be formed from a plurality or combination of materials. For example, a strength member may be formed as a central rod (e.g., an FRP rod, etc.) that is coated with one or more additional layers, such as an elastomeric layer (e.g., silicone rubber, etc.) that provides compression cushioning and/or a friction inducing coating that promotes physical bonding and/or thermal coupling between the strength member and the tight buffered optical fibers 310A-F. Additionally, a strength member may have any desired diameter and/or other dimensions as desired in various embodiments. For example, a strength member may be sized based upon a number of optical fibers 310A-F and/or other cable components that are stranded with the strength member.

As desired, any number of suitable transmission media may be incorporated into a cable 300 and enclosed by the cable jacket 305. As shown in FIG. 3. one or more tight buffered optical fibers 310A-F may be situated within the jacket 305. Each of the optical fibers 310 may be similar to the optical fiber 100 described above with reference to FIG. 1. In other embodiments, twisted pair conductors, power conductors, buffer tubes containing one or more optical fibers and/or optical fiber ribbons, and/or other transmission media may be situated within a cable core. For example, a bundle of twisted pairs may be substituted for one of the tight buffered optical fibers 310 illustrated in the cable 300, As desired, other transmission media may be situated within a suitable sheath, shield layer, or other protective layer. For example, twisted pairs may be individually shielded or a shield may be formed around a group of twisted pairs. Indeed, a wide variety of cable configurations may be utilized as desired in various embodiments of the disclosure.

As desired in various embodiments, water swellable material may be incorporated into the cable 300. For example, water blocking gels, water blocking fibers, water blocking tapes, and/or water blocking yarns may be incorporated into the cable 300. As shown in FIG, 3, in certain embodiments, a water blocking tape 320 may be positioned within the cable core between the optical fibers 310A-F and the outer jacket 305. In certain embodiments, the cable 300 may be formed as a dry cable. The term "dry," as used herein in the context of characterizing a cable or a fiber subunit (e.g., a buffer tube, etc.) within a cable, generally indicates that the cable noes not contain any fluids, greases, or gels for blocking water incursion, As a result, it may be easier for a technician to install the cable as the technician will not be required to wipe off a grease or gel when the internal contents of the fiber subunit are accessed. In other embodiments, a water blocking gel or other fluid may be incorporated into the cable.

As desired in various embodiments, a wide variety of other materials may be incorporated into the cable 300. For example, the cable 300 may include an armor layer (e.g., a metal armor layer, a corrugated armor layer, etc.) and/or a location element. An example location element may include a metallic wire (e.g., a copper wire) or embedded into or attached to the jacket 305 that permits the cable to be located, for example. when buried. Additionally, as desired, the cable 300 may include a wide variety of strength members, insulating materials, dielectric materials, flame retardants, flame suppressants or extinguishants, and/or other materials.

Figure 4:
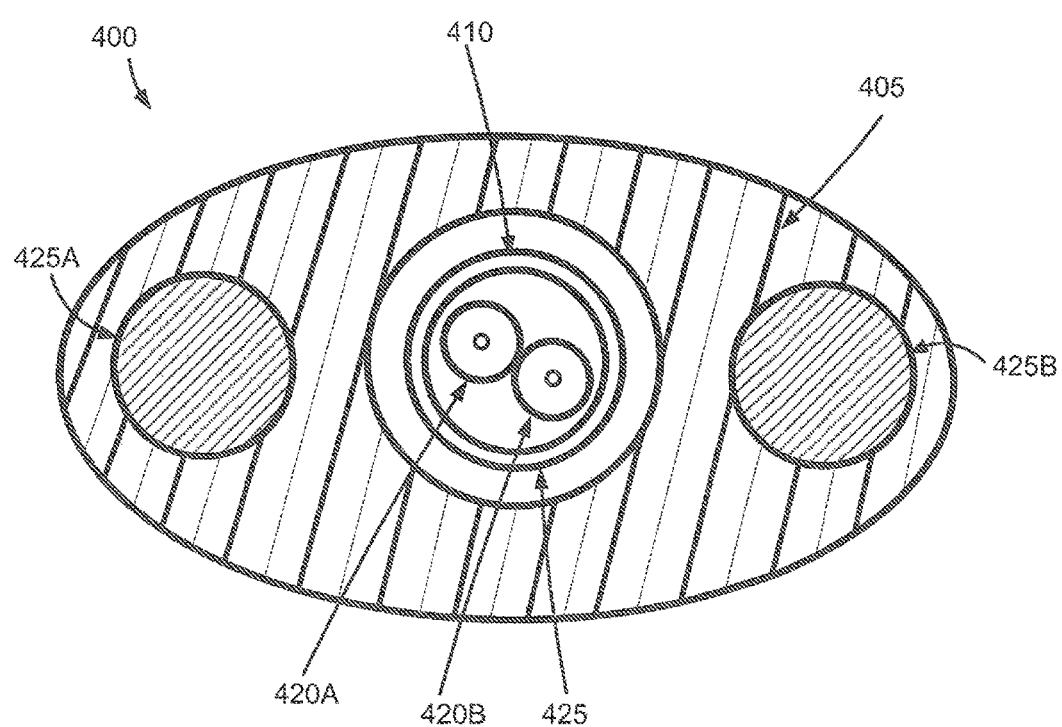

FIG. 4 illustrates another example cable 400 that may incorporate tight buffered optical fibers, according to illustrative embodiments of the disclosure. The cable 400 is illustrated as a fiber optic drop cable. However, as mentioned above, a wide variety of other types of cables may incorporate tight buffered optical fibers including a strippable buffer layer. With reference to FIG. 4, the cable 400 may include an outer jacket 405, and at least one optical fiber subunit 410 may be situated or positioned within the outer jacket 405, for example, within an opening or core formed in the outer jacket 405. Each optical fiber subunit 410 may include a suitable sheath layer 415 (or sheath), and one or more tight buffered optical fibers 420A, 420B may be positioned within the sheath 415. In certain embodiments, a ripcord may also be positioned within the sheath 415. In other embodiments, tight buffered optical fibers may be positioned within a core of the outer jacket 405 without being incorporated into a fiber subunit or enclosed by a sheath layer.

Similar to the cable 300 of FIG. 3. the jacket 405 may enclose the internal components of the cable 400, seal the cable 400 from the environment, and provide strength and structural support. The jacket 405, which may include any number of layers (e.g., a single layer, dual layers, etc.) may be formed from a wide variety of suitable materials and/or may include a wide variety of suitable shapes and/or dimensions. As shown in FIG. 4, the jacket 405 may be formed to result in an elliptical cable or a cable having an approximately oval cross-section; however, the jacket 405 and internal components may be formed to result in other desired shapes, such as a round or a rectangular shape.

The jacket 405 may enclose one or more openings in which other components of the cable 400 are disposed. At least one opening enclosed by the jacket 405 may be referred to a cable core, and transmission media may be disposed in the cable core. In the cable 400 illustrated in FIG. 4, a fiber optic subunit 410 may be disposed in the cable core. In certain embodiments, the jacket 405 may be extruded or poltruded over the fiber optic subunit 410 during construction of the cable 400. As a result, the cable core may be defined by the size of the fiber optic subunit 410 during cable construction. In other embodiments, the jacket 405 may be extruded formed over one or more removable elements (e.g., rods, etc.) in order to define at least one cable core into which a fiber optic subunit 410 can be inserted or positioned. Alternatively, at least one opening may be bored or otherwise formed from a jacket 405, and a fiber optic subunit 410 can be inserted or positioned within the at least one opening.

As desired, any number of suitable transmission media may be incorporated into a cable 400 and enclosed by be cable jacket 405. In certain embodiments, the cable 400 may be formed as a fiber optic cable, and one or more optical fibers may be enclosed by the cable jacket 405. According to an aspect of the disclosure, at least one of the optical fibers may be a tight buffered optical fiber similar to the optical fiber 100 illustrated and described above with reference to FIG. 1. As desired in certain embodiments, the optical fibers may be incorporated into one or more fiber optic subunits, such as subunit 410, or alternatively, one or more fibers may be positioned in a core without being incorporated into a subunit. In other embodiments, the cable 400 may be formed as a composite cable that includes both optical fibers and one or more other types of transmission media, such as one or more twisted pairs of conductors, one or more electrical power conductors, and/or one or more coaxial cables.

In certain embodiments, one or more strength members may be incorporated into the cable 400. For example, one or more strength rods may be embedded in the cable jacket 405. As shown in FIG. 4, strength rods 425A, 425B may be embedded in the cable jacket 405 on opposite sides of the fiber subunit 410. In other embodiments, strength rods may be embedded at other positions within the jacket 405. Other example embodiments may include strength members incorporated into a cable core. For example, strength members may be positioned adjacent to the fiber subunit 410. Indeed, a wide variety of different cable constructions may incorporate one or more fiber subunits and one or more strength members at various positions. As described above with reference to the strength member 315 of FIG. 3, strength members, such as strength rods 425A, 425B, may be formed from a wide variety of suitable materials. Additionally, a strength member may have any desired diameter and/or other dimensions as desired in various embodiments.

The jacket 405 may be a single layer jacket or, alternatively, may have multiple layers. In certain embodiments, a first (or inner) jacket layer may be extruded or otherwise formed over the fiber subunit 410. A second (or outer) jacket layer may then be extruded or otherwise formed over the first jacket layer and the strength rods 425A, 425B. The second jacket layer may be designed to be at least partially stripped from the inner jacket layer, for example, using a suitable stripping tool. As a result, the outer jacket layer and the strength rods 425A, 425B can be selectively removed from the cable 400. When the outer jacket layer is maintained, the cable 400 may be more suitable for outdoor deployment. When the outer jacket layer is removed or stripped, the cable 400 may be inure suitable for indoor deployment. Thus, the outer jacket layer may be selectively removed during installation of the cable and a portion of the cable may be deployed in an outdoor environment while another portion of the cable is deployed in an indoor environment. In other embodiments, a single jacket layer may be extruded over a combination of the fiber subunit 410 and the strength rods 425A, 425B.

In certain embodiments, one or more optical fibers 420A, 420B may be disposed within an optical fiber subunit 410. An optical fiber subunit 410 may include a sheath 415 formed or positioned around one or inure internal components, such as the optical fibers 420A, 420B and, in certain embodiments, a ripcord 125. Any number of optical fibers may be situated within the fiber subunit 410, and the fibers 420A, 420B may extend lengthwise along the cable 400. In certain embodiments, the cable 400 may be formed as a simplex drop cable with a single optical fiber positioned in the fiber subunit 410. In another embodiment, the cable 400 may be formed as a duplex drop cable with two optical fibers positioned in the fiber subunit 410. Other numbers of optical fibers may be utilized in other embodiments. Indeed, in various embodiments, a fiber subunit 410 may include one, two, four, eight, twelve, or some other number of optical fibers.

With continued reference to the fiber subunit 410, the sheath 415 may be formed around the internal components (e.g., the optical fibers 420A, 420B, a rip cord, etc.) of the fiber subunit 410. In certain embodiments, the sheath 115 may be formed as a tube or shield around the internal components of the fiber subunit 410. As desired, the sheath 415 may separate the internal components of the fiber subunit 410 from the inner surface of the jacket 405. As desired in various embodiments, the sheath 415 may include any number of suitable layers (e.g., a single layer, multiple layers). For example, the sheath may be formed as a dual layer sheath. Additionally, each layer of the sheath 415 may be formed from a wide variety of suitable materials. Examples of suitable materials include, but are not limited to, various polymers or polymeric materials, acrylate or acrylics (e.g., acrylic elastomers, etc.), polyvinyl chloride ("PVC"), polyurethane, a fluoropolymer, polyethylene, neoprene, ethylene, plastic, rubber, or other appropriate materials or combinations of suitable materials.

In one example embodiment, the sheath 415 may be formed from two polymer layers. For example, the sheath 415 may be formed as a dual layer acrylate tube. In certain embodiments, an outer layer of the sheath 415 may be harder than an inner layer of the sheath 415. In other words, the inner layer may have a lower durometer than the outer layer. In this regard, the inner layer may more easily conform to the shape of the internal components of the fiber optic subunit 410 while the outer layer exhibits greater compression resistance, and therefore, provides greater structural support, and therefore, increase protection. Additionally, in certain embodiments, one or more coatings or treatments may be applied to the sheath 415. For example, microparticles, microspheres, microbeads, microencapsulants, or other suitable particulate matter (e.g., glass microbeads, polytetrafluoroethylene ("PTFE") microparticles, thermoplastic microparticles, etc.) may be embedded into or attached to an outer surface of the sheath 415. The microparticles may lower or reduce the coefficient of friction between the fiber subunit 410 and the cable jacket 405, thereby permitting the fiber subunit 410 to readily or more easily find its lowest stress state when threes are applied to the cable 400. As a result, stresses exhibited on the cable jacket 405 may be decoupled from the fiber subunit 410 and the optical fibers 420A, 420B disposed therein.

Additionally, in certain embodiments, the cable 400 may be formed as a "dry" cable. As a result, it may be easier for a technician to install the cable as the technician will not be required to wipe of a grease or gel when the internal contents of the fiber subunit 410 are accessed. In other embodiments, the fiber subunit 410 may be filled or partially filled with a suitable filling compound, such as a gelatinous, solid, powder, moisture absorbing material, water-swellable substance, dry filling compound, or foam material.

As desired in various embodiments, a wide variety of other materials may be incorporated into the cable 400. For example, the cable 400 may include an armor layer (e.g., a metal armor layer, a corrugated armor layer, etc.), water blocking material (e.g., water blocking yarns, water blocking fibers, water swellable materials, water blocking powders, water blocking gels, etc.), and/or a location element. An example location element may include a metallic wire (e.g., a copper wire) or strip embedded into or attached to the jacket 405 that permits the cable to be located, for example, when buried. Additionally, as desired, the cable 400 may include a wide variety of strength members, insulating materials, dielectric materials, flame retardants, flame suppressants or extinguishants, and/or other materials.

The cables 300, 400 illustrated in FIGS. 3 and 4 are provided by way of example only. Embodiments of the disclosure contemplate a wide variety of other cables and cable constructions. These other cables may include more or less components than the cables 300, 400 illustrated in FIGS. 3 and 4. Indeed, tight buffered optical fibers having strippable buffer layers may be incorporated into a wide variety of different types of cables.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for forming a tight buffered optical fiber, the method comprising:
providing an optical fiber;
extruding a buffer layer formed from polymeric material around the optical fiber; and
compressing the buffer layer while the polymeric material is cooling following extrusion,
whereon the compression facilitates subsequent loosening of the buffer layer from the optical fiber based at least in part upon stress relaxation of the buffer layer.

2. The method of claim 1, wherein compressing the buffer layer comprises compressing when the polymeric material is at a temperature that permits compression of the buffer layer without deforming a cross-section of the batter layer.

3. The method of claim 1, wherein compressing the buffer layer comprises compressing when the polymeric material is at a temperature between its glass transition temperature and its melt point.

4. The method of claim 1, wherein compressing the buffer layer comprises compressing the buffer layer by an amount that is equal to or greater than an amount of post-extrusion shrinkage applicable to the buffer layer without compression.

5. The method of claim 1, further comprising cooling the buffer layer prior to compressing the buffer layer.

6. The method of claim 1, wherein extruding a buffer layer formed from polymeric material comprises extruding a buffer layer comprising at least one of polypropylene, polyvinyl chloride, nylon, or low smoke zero halogen, material.

7. The method of claim 1, further comprising cooling the buffer layer following compression.

8. The method of claim 1, further comprising reheating the buffer layer following compression and subsequent cooling in order to facilitate stress relaxation.

9. The method of claim 1, further comprising bending the optical fiber following compression and subsequent cooling.

10. The method of claim 1, further comprising applying a water blocking substance to a outer surface of the optical fiber prior to extruding the buffer layer.

11. A method for forming a tight buffered optical fiber, the method comprising:
    extruding a buffer layer around an optical fiber; and
    compressing, following the extrusion, the buffer layer prior to the buffer layer completely cooling,
    wherein the compression facilitates subsequent loosening of the buffer layer from the optical fiber.

12. The method of claim 11, wherein compressing the buffer layer comprises compressing the buffer layer at a temperature that permits compression without deforming a cross-section of the buffer layer.

13. The method of claim 11, wherein compressing the buffer layer comprises compressing the buffer layer at a temperature between a glass transition temperature and a melt point of a material utilized to form the buffer layer.

14. The method of claim 11, wherein compressing the buffer layer comprises compressing the buffer layer by an amount that is equal to or greater than an amount of post-extrusion shrinkage applicable to the buffer layer without compression.

15. The method of claim 11, wherein extruding a buffer layer comprises extruding a buffer layer comprising at least one of polypropylene, polyvinyl chloride, nylon, or low smoke zero halogen material.

16. method of claim 11, further comprising reheating the buffer layer following compression and subsequent cooling in order to facilitate stress relaxation of the buffer layer.

17. The method of claim 11, further comprising bending the optical fiber following compression and subsequent cooling of the buffer layer.

18. The method of claim 11, further comprising applying a water blocking substance to an outer surface of the optical fiber prior to extruding the buffer layer.

19. A method for forming a tight buffered optical fiber, the method comprising:
    extruding a polymeric material around an optical fiber to form a tight buffer layer; and
    compressing, while the polymeric material is cooling following the extrusion, the tight buffer layer by an amount that is equal to or greater than an amount of post-extrusion shrinkage applicable to the tight buffer layer without compression,
    wherein the compression facilitates subsequent loosening of the tight buffer layer from the optical fiber.

20. The method of claim 19, wherein compressing the buffer layer comprises compressing the buffer layer at a temperature between a glass transition temperature and a melt point of a material utilized to form the buffer layer.

* * * * *